United States Patent
Thiam (10) Patent No.: US 10,452,286 B2
(45) Date of Patent: Oct. 22, 2019

(54) LEVERAGING CONTINUOUS REPLICATION TO COPY SNAPSHOT BACKUP IMAGE

(71) Applicant: Dell Products, L.P., Round Rock, TX (US)

(72) Inventor: Alioune Thiam, Hugo, MN (US)

(73) Assignee: QUEST SOFTWARE INC., Aliso Viejo, CA (US)

( * ) Notice: Subject to any disclaimer, the term of this patent is extended or adjusted under 35 U.S.C. 154(b) by 25 days.

(21) Appl. No.: 15/045,545

(22) Filed: Feb. 17, 2016

(65) Prior Publication Data

US 2017/0235506 A1    Aug. 17, 2017

(51) Int. Cl.
*G06F 3/06* (2006.01)
*G06F 11/14* (2006.01)

(52) U.S. Cl.
CPC .......... *G06F 3/0619* (2013.01); *G06F 3/065* (2013.01); *G06F 3/067* (2013.01); *G06F 3/0665* (2013.01); *G06F 11/14* (2013.01)

(58) Field of Classification Search
CPC ......... G06F 3/0619; G06F 3/065; G06F 3/067
See application file for complete search history.

(56) References Cited

U.S. PATENT DOCUMENTS

| 2008/0072003 A1* | 3/2008 | Vu .................. G06F 3/0617 711/162 |
| 2012/0079221 A1* | 3/2012 | Sivasubramanian ........ G06F 11/1456 711/162 |
| 2013/0282976 A1* | 10/2013 | Dubnicki ............... G06F 12/00 711/112 |
| 2015/0242147 A1* | 8/2015 | Sakaguchi ............. G06F 11/14 711/162 |
| 2017/0300505 A1* | 10/2017 | Belmanu Sadananda .............. G06F 17/30088 |

* cited by examiner

*Primary Examiner* — Edward J Dudek, Jr.
(74) *Attorney, Agent, or Firm* — Maschoff Brennan (57) ABSTRACT

Systems, methods and devices provide efficient data protection by creating backup images of snapshots using the replication capabilities of the data protection system. The snapshots are point-in-time representation of a data set, where the snapshots allows recoverable states of the data set without having to make a complete copy. A snapshot to be backed up is stored in a primary volume. A virtual volume is created, the virtual volume comprising references, such as pointers, to the snapshot data stored in the primary volume. The snapshot data referenced by the virtual volume is then replicated using the replication capabilities of the data protection system. In this manner, the replication of the snapshot does not burden the primary volume that is hosting the snapshot storage.

20 Claims, 5 Drawing Sheets

LEVERAGING CONTINUOUS REPLICATION TO COPY SNAPSHOT BACKUP IMAGE

FIELD

This disclosure relates generally to enterprise data protection, and more specifically, to backup using snapshot replication images in an enterprise data protection system.

BACKGROUND

As the value and use of information continues to increase, individuals and businesses seek additional ways to process and store information. An option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

The size and number of enterprises data systems continues to grow along with the amount of digital information that is generated and stored for later use. Enterprise data systems provide storage for enterprise data. A wide variety of storage networks and arrays may be utilized by enterprise data systems for storing the enterprise data. In addition to data storage, enterprise data systems may provide the ability to protect enterprise data from loss or destruction by creating backup copies of the data to be protected.

The growth in scale of enterprise data systems has challenged conventional backup technologies. Creating backups of large enterprise systems is a relatively lengthy process that may affect the production system and may require large amounts of storage capacity.

SUMMARY

Embodiments described herein provide efficient data protection using snapshot replication. For example, certain embodiments may provide the ability to create backup images of snapshots using replication, where the replication is implemented in a manner that does not burden the production system primary volume that is hosting the snapshot storage. In this manner, replication can be used to provide backups of snapshots. Even though in general replication does not ordinarily maintain recoverable states of the replicated data, snapshots are static and thus may be preserved as backup images using replication. Backup is the process through which the data on the primary system is copied to a secondary devices for recovery. Traditionally, a backup process requires reading the data to be backed up from the production system and writing the backup to a different storage system every time a backup of the data is to be made. This solution provides backup of snapshots without the attendant disadvantages of a traditional backup process. The described embodiments obtain a snapshot of the data and create a backup of the snapshot by replicating it to a secondary system. The described embodiments does not impact the production system due to the creation of virtual volume that tracks the snapshot and from which the snapshot is replicated.

According to various embodiments, a data protection system, method or device are configured to backup snapshot data, wherein the data protection system stores the snapshot data in a primary volume; creates a virtual volume, the virtual volume comprising references to the snapshot data stored in the primary volume; and replicates the snapshot data referenced by the virtual volume.

In certain additional embodiments, the primary volume is replicated to one or more target volumes. In certain additional embodiments, the primary volume is replicated by a replication system of the data protection system. In certain additional embodiments, the virtual volume is replicated by the replication system of the data protection system. In certain additional embodiments, the virtual volume is replicated to a snapshot backup image volume. In certain additional embodiments, the primary volume and the virtual volume are within the same storage device. In certain additional embodiments, the data protection system monitors for completion of the replication of the virtual volume; and discontinues replication of the virtual volume upon completion. In certain additional embodiments, the data protection system deletes the virtual volume upon completion. In certain additional embodiments, a first snapshot data is stored to the primary volume in response to a command triggering the generation of the snapshot at a first time and wherein a second snapshot data is stored to the primary volume in response to a command triggering the generation of the snapshot at a second time. In certain additional embodiments, the data protection system deletes replicated snapshot data corresponding to snapshots generated between the first time and the second time.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For years, backups were largely limited to creating a copy of a dataset or storage volume to be protected and storing the copy at a remote location, or at least on a separate storage device. Replication is a mechanism more recently employed by enterprise data protection systems to safeguard enterprise data without relying strictly on traditional, monolithic backup processes that make a bulk copy of the enterprise data. Data replication is used to protect data from loss and ensure business continuity by distributing the data to be protected between multiple storage devices.

Data replication typically requires making read-only copies of data from a source storage device to one or more target storage devices. The target devices may be located on a remote host or are distributed across multiple remote hosts. In addition to backing up source data, replication also provides the benefit of making the source data available at one or more remote locations where it can most efficiently accessed by systems relying on the source data. Various replication strategies are utilized for determining the source data to distributed, the number and location of target devices to be used for replicating particular source data, and the propagation of changes throughout the replicated volumes. Replication does not replace the need for monolithic backups, since the replicated target volumes are typically updated to reflect changes in the replicated source data and thus do not reflect a historical state of the source data.

Snapshots are another mechanism employed by certain enterprise data protection systems to safeguard enterprise data. Snapshots allow recoverable states in the enterprise data without having to make a complete backup copy of the enterprise data. A snapshot is point-in-time representation of the enterprise data at a particular time. In certain scenarios, the snapshot is stored on the same disk or storage device as the enterprise data. Using a previously recorded snapshot, the enterprise data can be restored at a later point in time. Snapshots can be taken at scheduled intervals in order to provide regular updates to mass storage backup volumes.

A snapshot is a space-efficient representation of state information and is not a complete backup copy that can be used to recover the source data when the volume storing the snapshot is destroyed. Instead, a space efficient snapshot tracks the state of the data at the time of the snapshot.

The snapshot allows a backup copy to be updated to reflect the source data at the point in time of a snapshot. In order to create a true recovery point, a snapshot may be copied to a secondary array or storage along with the associated backup copy and any interleaving snapshots from the associated backup copy.

In various embodiments, the systems and methods for backing up snapshot data described herein may be implemented as component of backup solution supported by an enterprise data production system. Additionally, the various embodiments utilize the replication capabilities of the data protection system in order to back up the snapshot data. Replication is not conventionally utilized in implementing backup solutions due to the lack of support for recovery points based on the replicated data.

For purposes of this disclosure, an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network storage device, a network router, a network video camera, a data recording device used to record physical measurements in a manufacturing environment, or any other suitable device and may vary in size, shape, performance, functionality, and price. The IHS may include memory, one or more processing resources, e.g., a central processing unit (CPU) or hardware or software control logic. Additional components or the IHS may include one or more storage devices, one or more communications ports for communicating with external devices as well as various input and output (I/O) devices, e.g., a keyboard, a mouse, and a video display. The IHS may also include one or more buses operable to transmit communication between the various hardware components.

Also for purposes of this disclosure, computer-readable media may include any instrumentality or aggregation of instrumentalities that may retain data and/or instructions for a period of time. Computer-readable media may include, without limitation, storage media, e.g., a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory. Computer-readable media may also include optically readable barcodes (one or two-dimensional), plastic cards with embedded magnetic stripes, mechanically or optically read punched cards, or radio frequency identification tags.

Figure 1:
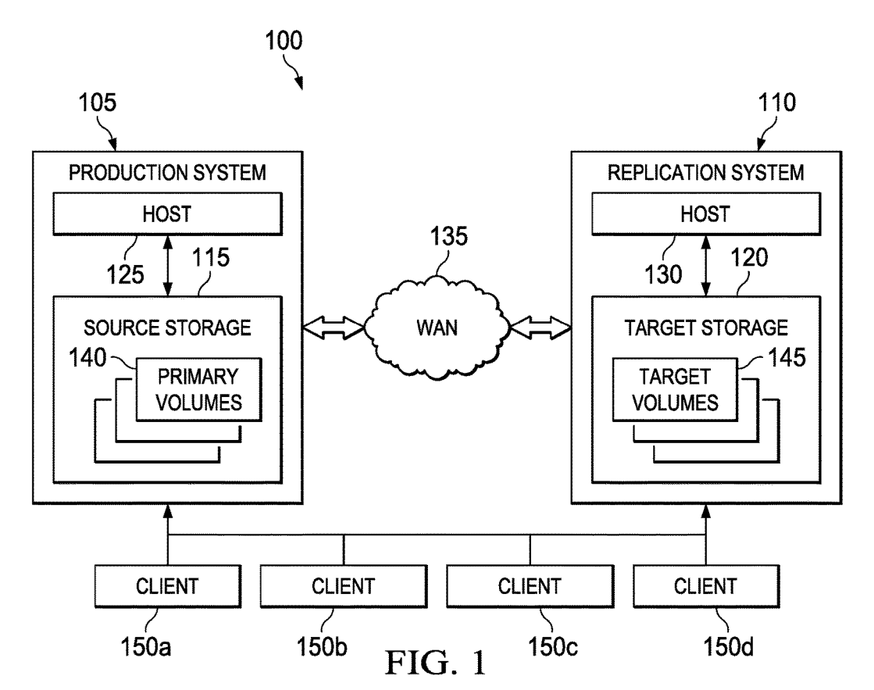
FIG. 1 is a block diagram illustrating certain components of a data protection system.

FIG. 1 is a block diagram that depicts certain components of a data protection system 100 that utilizes data replication. The data protection system 100 includes a production system 105 and a replication system 110. The data protection system 100 stores enterprise data in storage volumes on the production system 105 and the replication system 110. In the production system 105, enterprise data is stored in one or more primary volumes 140 comprises within a source storage 115. The primary volumes 140 may be a set of logical or physical storage volumes located within a single source storage device or may be comprised of an array of source storage devices.

The data protection system 100 replicates one or more volumes selected from the set of primary volumes 140 present in the source storage 115. The selected primary volume(s) from the source storage 115 is replicated to one or more target storage locations. In the illustrated data protection system 100, the enterprise data is replicated in a single replication system 110 consisting of a single target storage 120 that is comprised of a set of target volumes 145. Other data protection systems may replicate a primary volume to multiple replication systems or to a replication system consisting of multiple target storage components.

The production system 105 includes a host 125 which issues commands and provides administrative functions relating to the replication of the enterprise data. The replication system 10 likewise includes a host 130 that issues command and provides administrative functions relating to the replication of the enterprise data. In the illustrated data protection system 100, the production system 105 and the replication system 110 are coupled via a wide area network (WAN) 135 connection. Other data protection system may be linked in different types of networks. Together the host 125 of the production system 105 and the host 130 of the replication system 110 coordinate the replication of the enterprise data across the WAN 135 connection.

The data protection system 100 provides clients 150*a-d* access to the enterprise data. The clients 150*a-d* can receive the enterprise data from the primary volumes 140 of the production system 105 or from the target volumes 145 of the replication system 110. The clients 150*a-d* may obtain the enterprise data from the read-only target volumes 145. In data protection systems utilizing multiple replicated target storage devices that are distributed within a network, the individual clients may obtain the enterprise data from a target storage device that can be most efficiently accessed by that client. In order to modify the enterprise data, the clients 150a-d do so via the source storage 115 of the production system 105. Any such changes to the enterprise data stored in the production system 105 will be propagated to the target volumes 145 of the replication system 110.

Figure 1A:
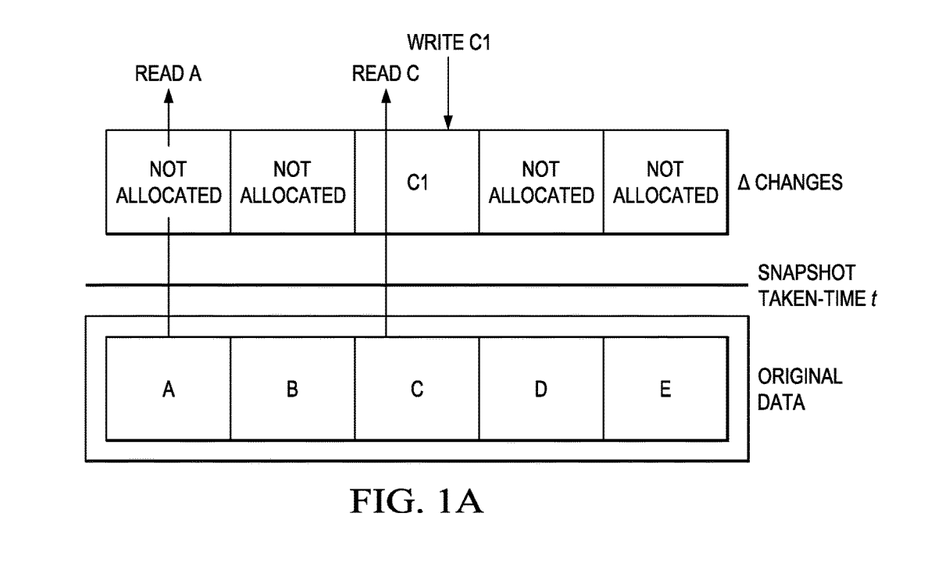
FIG. 1a is a block diagram illustrating certain aspects of snapshots in a data protection system.

FIG. 1a is block diagram that illustrates certain aspects of snapshots in a data protection system. An original data set is illustrated consisting of data elements A-E. At time t, a snapshot is taken of the original data set. The snapshot process determines a change in data element C. The snapshot process then determines the change between the new state and previous state of data element C and allocates a block of storage for preserving this snapshot of the changes from the original data set at time t. This allocated block of storage for C1 in the snapshot reflects the change in data element C and enables restoring data element C to its state prior to time t. The allocated storage for the snapshot typically resides on the same storage device as the data set. For instance, both the snapshot and the data set are stored in the primary volume. No storage is allocated in the snapshot for data elements A, B, D and E, since there have been no changes to these data elements.

Figure 1B:
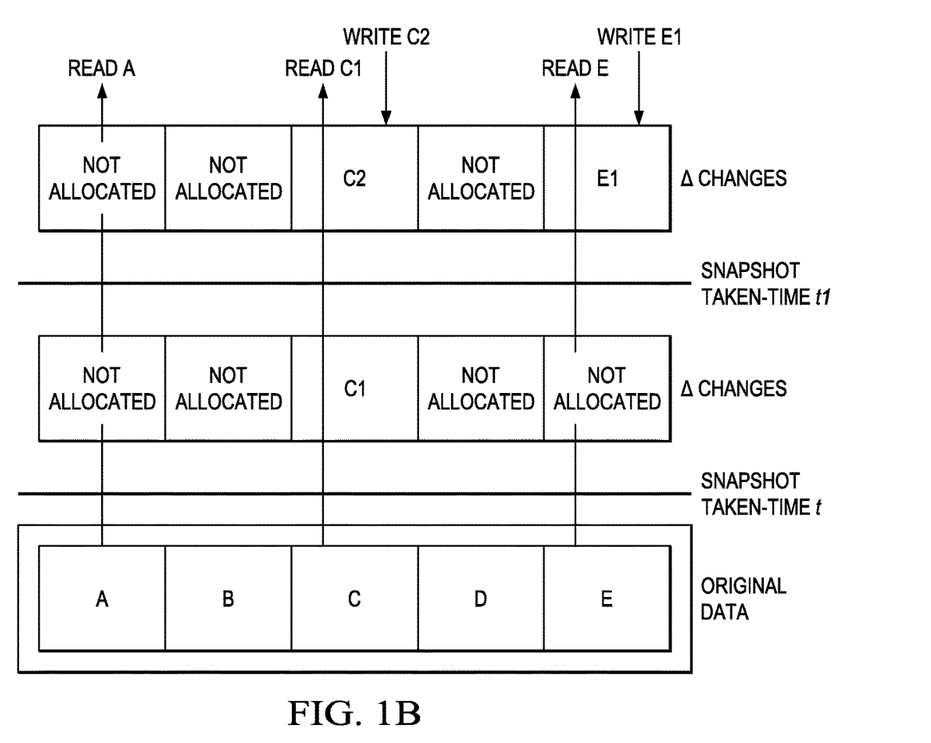
FIG. 1b is a block diagram illustrating certain additional aspects of snapshots in a data protection system.

FIG. 1b is a block diagram that illustrates a second snapshot taken of the original data set consisting of data elements A-E. At time t, a second snapshot is taken of the original data set, this time determining changes to data elements C and E. Consequently, in the t1 snapshot of the original data, blocks of storage are allocated to store information that can be used to restore data elements C and E to their pre-t1 states. No blocks of storage are allocated in the t1 snapshot for data elements A, B and D since there are no changes to restore in these data elements.

Figure 2:
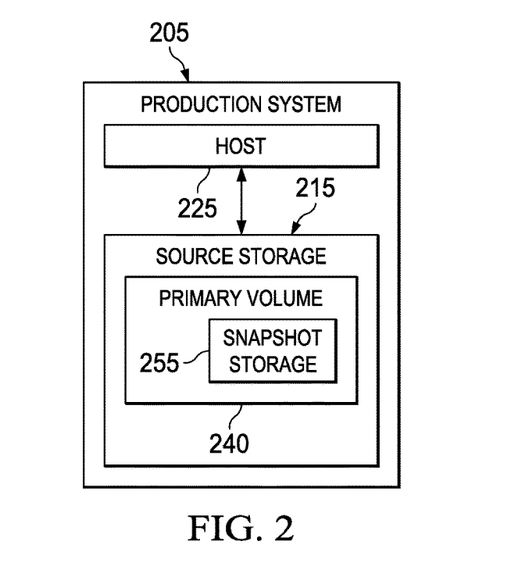
FIG. 2 is a block diagram illustrating certain components of a production system of a data protection system that utilizes snapshots.

FIG. 2 is a block diagram that depicts certain components of a data protection system 200 that utilizes snapshots to safeguard enterprise data. The snapshots of the enterprise data are point-in-time representations of the state of the enterprise data. Using the snapshots enables the restoring of enterprise data to its state at the time of the snapshot. As described, the snapshot allows recovery of a particular state of the enterprise data, but does not include a full copy of the enterprise data and thus cannot be used to recover the enterprise data itself.

Various methodologies for generating snapshots may be employed. For instance, the production system 205 may be configured to automatically generate snapshots of the enterprise data on a periodic basis as part of a comprehensive data protection scheme. The production system 205 may also be configured to generate a snapshot based on a command issued by a user or administrator of the system. The production system 205 may also be configured to generate a snapshot based on any number of conditions, such as low rate of change in the enterprise data stored in the primary volume or the enterprise data is otherwise determined to be in a stable and consistent state.

The production system 205 may utilize various techniques for generating and managing snapshots. For instance, upon generating a snapshot representing a point-in-time state of enterprise data stored in the primary volume 240, the generated snapshot is stored to a snapshot storage 255 of the primary volume. In certain configurations, each snapshot generated by the production system 205 may overwrite any snapshot previously stored to the snapshot storage 255. In other configurations, the production system 205 may support the generation and storage of multiple snapshots of the enterprise data to the snapshot storage 255. The maximum number of snapshots that can be stored at once in the snapshot storage 255 will depend at least in part on the size of the snapshot storage 255, but may also depend on additional factors. In certain configurations of the production system 205, snapshots present in snapshot storage 255 may expire and thus deleted from the snapshot storage after a certain time duration from the time of the snapshot.

Several potential issues may arise in a snapshot implementation such as described with respect to FIG. 2. Even though an enterprise data snapshot may be expected to be much smaller in size than a complete backup copy of the enterprise data, snapshots may nonetheless require substantial storage, especially as the number of retained snapshots increases. In the production system 205, the capacity of the snapshot storage 255 will be limited at least in party by the need to preserve primary volume 240 storage capacity for use by the production system. As such, the limited capacity of the snapshot storage 255 may limit the number of snapshots that may be stored therein. Another issue with storing snapshots in the primary volume 240 is the risk of loss of the snapshots due to failure of the primary volume 240 and/or source storage 215.

Certain approaches may be used for preserving snapshot backup images for later use in recovery of state information. In one approach, a snapshot is preserved by generating a backup of the snapshot and the associated enterprise data needed to provide a complete recovery point. Such an approach is time consuming and consumes significant processing and memory resources. In another approach, the replication system of the production system can be used to replicate the snapshot data, thus preserving the snapshot data. However, in most data protection systems, replication is a volume level operation, thus requiring the entire primary volume to be replicated in order to replicate the snapshot storage. In addition to consuming large amounts of resource, replicating the primary volume has a negative impact on the performance of the production system. If the replication of the primary volume is continuous, write performance of the production system may be compromised. If asynchronous replication is utilized, this results in additional loading of the host processing the requests. Another issue with replicating the primary volume is the fact that it may lead to the transfer of "additional data" (data that was created after the snapshot was taken).

A data protection system may backup the entire primary volume, which would thus create a backup of snapshots stored in the primary volume. This is an inadequate solution of snapshot backups for several reasons. The importance of snapshots to certain data protection systems requires providing a standalone backup solution for snapshots, separate from the backup solution provided with respect to the primary volume. Efficient usage of storage capacity further requires the ability to manage the snapshots that are backed up. Furthermore, conventional replication of the entire primary volume is an expensive operation that impacts the performance of the production system. As such, it may be infeasible to burden the primary volume of the production system each time the snapshot storage is replicated. Addressing such issues, a capability is provided that allows snapshot backup images to be preserved, where this capability utilizes replication in a manner that minimally burdens the production system.

Figure 3:
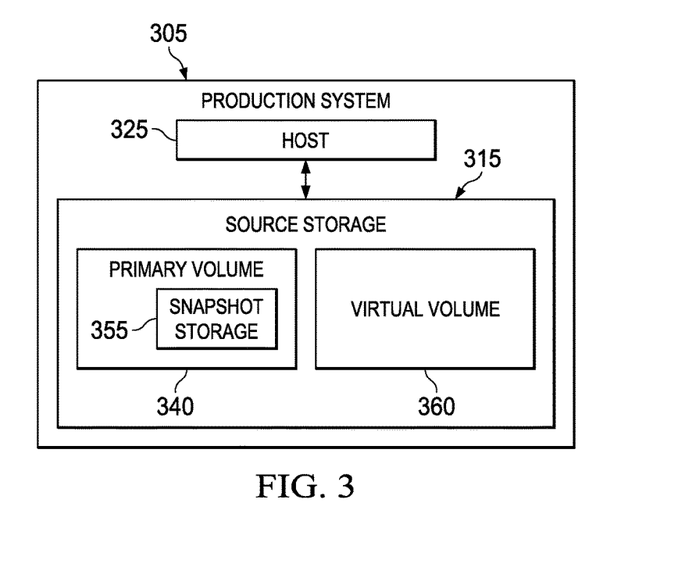
FIG. 3 is a block diagram illustrating certain components of a production system of a data protection system utilizes snapshots according to various embodiments.

FIG. 3 depicts certain components of a production system 305 according to certain embodiments. The production system 300 utilizes snapshots to safeguard point-in-time representations of the state of the enterprise data. Snapshots enable the restoring of enterprise data to its state at the time of the snapshot. The host 325 of the production system 305 issues a command directing the generation of a snapshot of enterprise data stored in the primary volume. The snapshot is stored to snapshot storage 355, within the primary volume 340.

According to various embodiments, a virtual volume 360 is created within the source storage 315. The virtual volume 360 includes pointers to the snapshot storage 355. The individual snapshots stored in the snapshot storage 355 are static, in that the addresses storing the snapshot are not being written to, thus providing the virtual volume 360 static snapshots to be replicated. The static nature of the snapshot data allows this particular data to be replicated without burdening the production system. In certain embodiments, the virtual volume 360 includes pointers to the snapshots stored in primary volume 340 and may utilize additional snapshot storages for similarly replicating snapshots from additional volumes.

Figure 4:
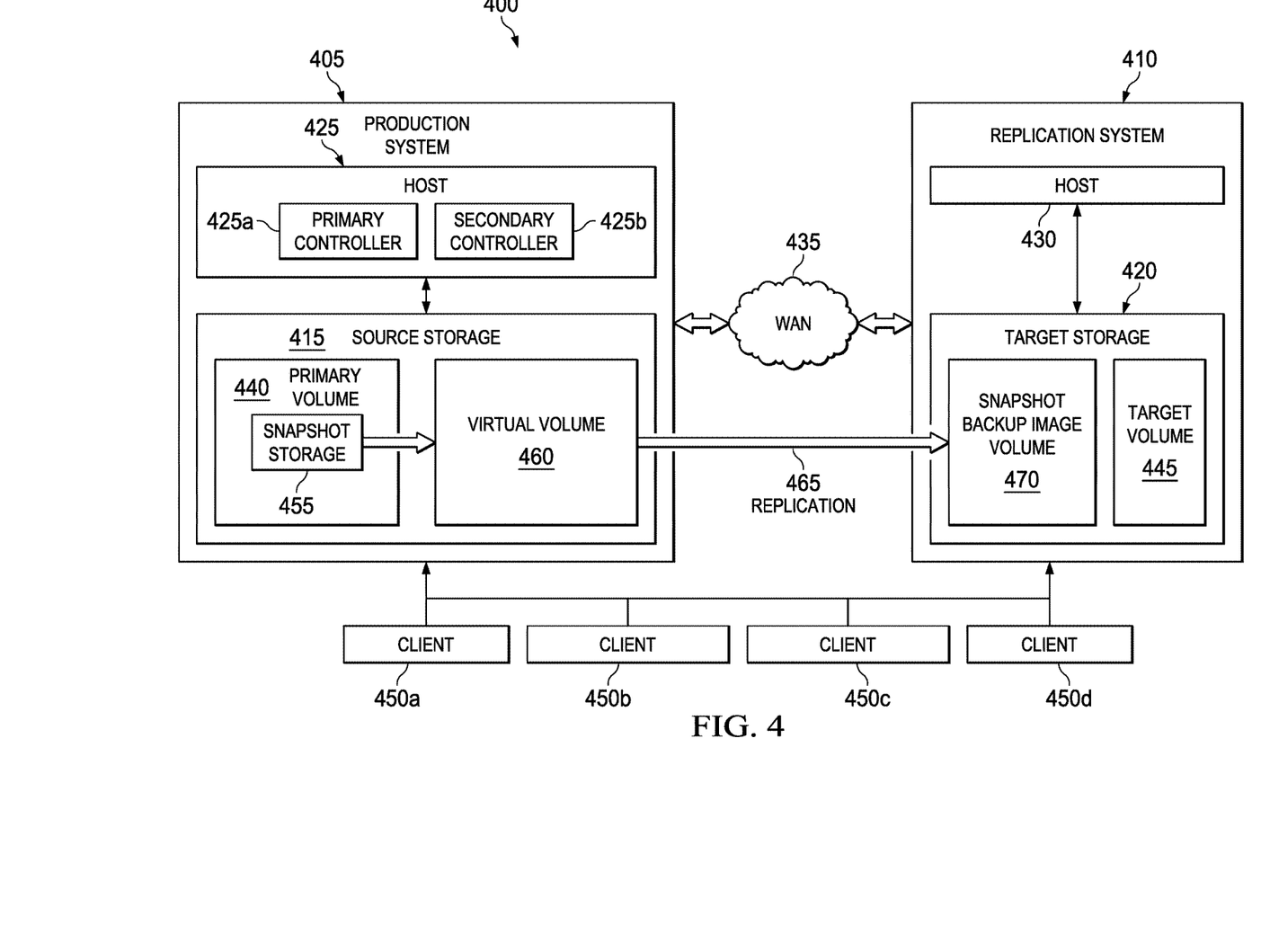
FIG. 4 is a block diagram illustrating certain components of a data protection system that utilizes replicated snapshot backup images according to various embodiments.

FIG. 4 is a block diagram depicting certain components of a data protection system 400 according to various embodiments. Data protection system 400 includes a production system 405 and a replication system 410 for use in replicating enterprise data stored in a primary volumes 440 comprised within a source storage 415. The replication system of the data protection system 400 replicates enterprise data 440 within a target volume 445 in target storage 420 of the replication system 405 via a WAN connection 435.

As described with respect to FIG. 4, the production system 405 is configured to support the backup of snapshot images by creating a virtual volume 460 that includes pointers to the snapshot storage 455 of the primary volume 440. The virtual volume 460 can then be replicated 465 using the same replication system of the production system 405 that is used to replicate the actual enterprise data of the primary volume 440. Using the replication system, the snapshots provided via the virtual volume 460 are replicated 465 to a snapshot backup image volume of the replication system 405. The snapshots provided via the virtual volume 460 are static representations of enterprise data states.

Replication of the snapshots to the snapshot backup image volume 470 thus provides backup of snapshots, separate from other backup mechanisms provided by the data protection system 400. The static nature of the snapshot data allows this data to be replicated with minimal burden on the replication system, since the delta computed by the replication system is calculated on static data. The snapshots replicated to the snapshot backup image volume 470 may be accessed by clients 450a-d as supported for other replicated volumes that are supported by the target storage 420 of the replication system 405.

In certain embodiments, the host 425 issues a command directing the replication 465 of the snapshot pointed to by the virtual volume 460 to the snapshot backup image volume 470. In certain embodiments, the host 425 may utilize a primary controller 425a to support the primary volume 440 and utilize a secondary controller 425b to support the replication of the snapshot data stored in the virtual volume 460. Utilizing a secondary controller in this manner, certain embodiments provide that ability to create backup images of the snapshot storage 455 while further minimizing the burden on the production system 405.

Figure 5:
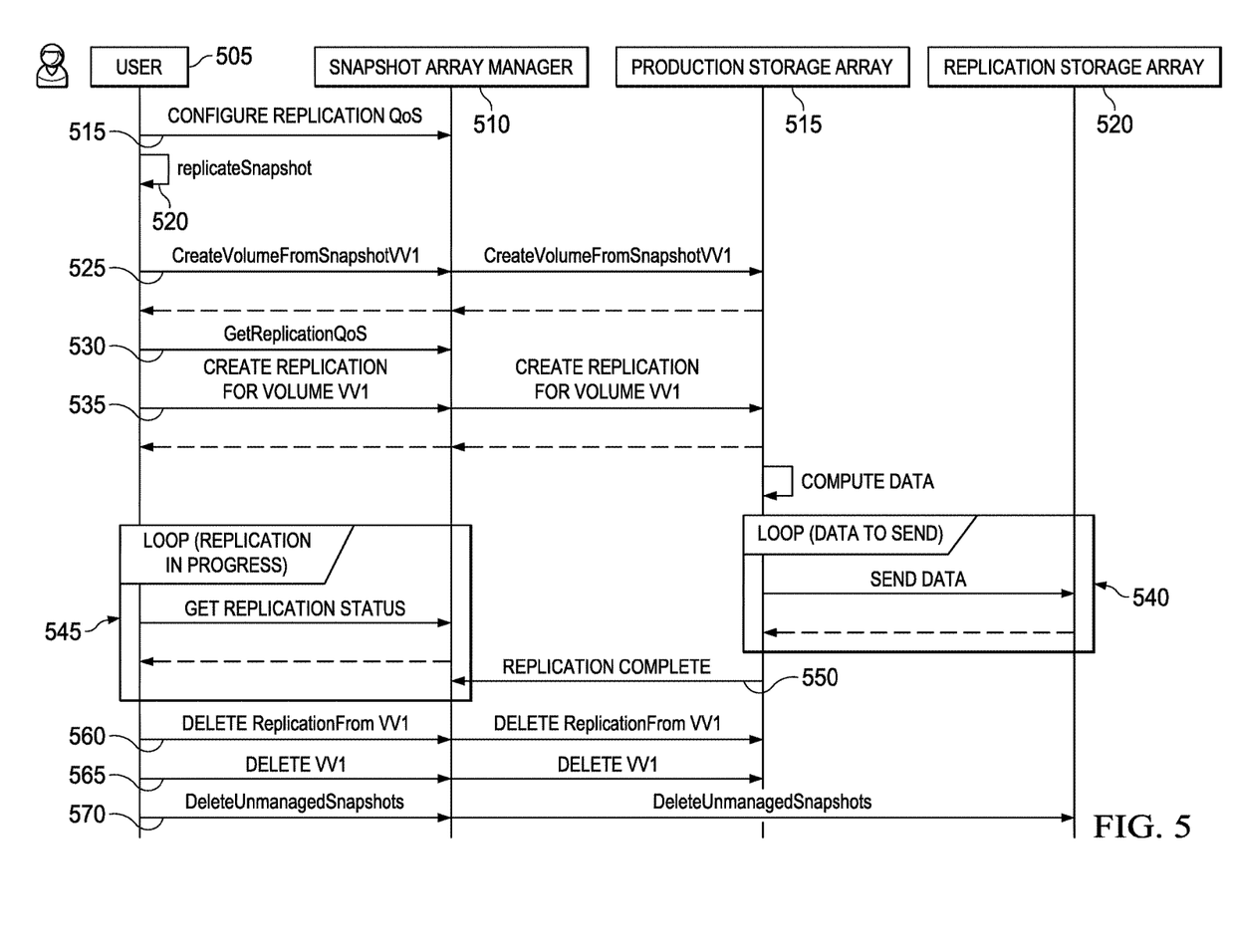
FIG. 5 is a sequence diagram illustrating certain steps of a method for generating replicated snapshot backup images according to various embodiments.

FIG. 5 is a sequence diagram illustrating certain aspects of the operation of a data protection system according to various embodiments, where the data protection system is configured to backup snapshots using replication. In the data protection system of FIG. 5, a snapshot array manager 510 interfaces with user 505 in the replication of snapshot images from a production storage array 515 to a replication storage array 520. In certain embodiments, the data protection system may be configured 515 to back up the snapshot data according to replication parameters maintained by the snapshot management system 510. The replication parameters may specify a replication system, the bandwidth available for replication and various other configurable aspects of the replication supported by the data protection system.

In certain embodiments, the backup of snapshot images begins with a user providing input 520 requesting backup of snapshot data maintained in the production storage array 515. In some embodiments, the request will instead be issued based on a command issued by the snapshot array manager 510 according to a backup policy implemented by the data protection system. In certain embodiments, a target volume in the replication storage array 520 is identified upon initiating a snapshot backup. This target volume may be specified as a replication parameter or my determined based on various factors, such as the source volume that hosts the snapshot data to be backed up or determined according to a backup policy.

The request to initiate a snapshot backup triggers the creation of a virtual volume 525 on the production storage array 515. As described above, the virtual volume includes pointers to the snapshot data stored in the production storage array 515. In certain embodiments, the user 505 issues a query 515 to the snapshot array manager 510 for the previously configured replication parameters. Based on these replication parameters, replication of the virtual volume stored in the production storage array 515 is configured 535. The production storage array 515 proceeds to replicate 540 the virtual volume to the replication storage array 520. This replication of the virtual volume may be monitored by the snapshot array manager 510. In certain embodiments, the user 505 is provided updates 545 regarding the status of the backup of the snapshot data via the replication of the virtual volume.

Upon completing the replication of the virtual volume, in certain embodiments, the production storage array 515 notifies 550 the snapshot array manager 510, which may in turn notify the user 505. With the replication complete, a command is issued 560 directing the production storage array 515 to discontinue replicating the virtual volume. Another command may be issued 565 directing the production storage array 515 to delete the virtual volume. In certain embodiments, a command may be issued 570 further directing the snapshot array manager 510 to delete unwanted snapshots replicated to the replication storage array 520. Since replication is performed by computing the difference between the last replicated snapshot and most recent snapshot present in the production storage array 515 at the time a snapshot backup is request, any snapshots taken between these two points would also be replicated. In some scenarios, back up of these interleaving snapshots may not be desired. In such scenarios, these interleaving snapshots may be deleted from the replication storage array 520.

Figure 6:
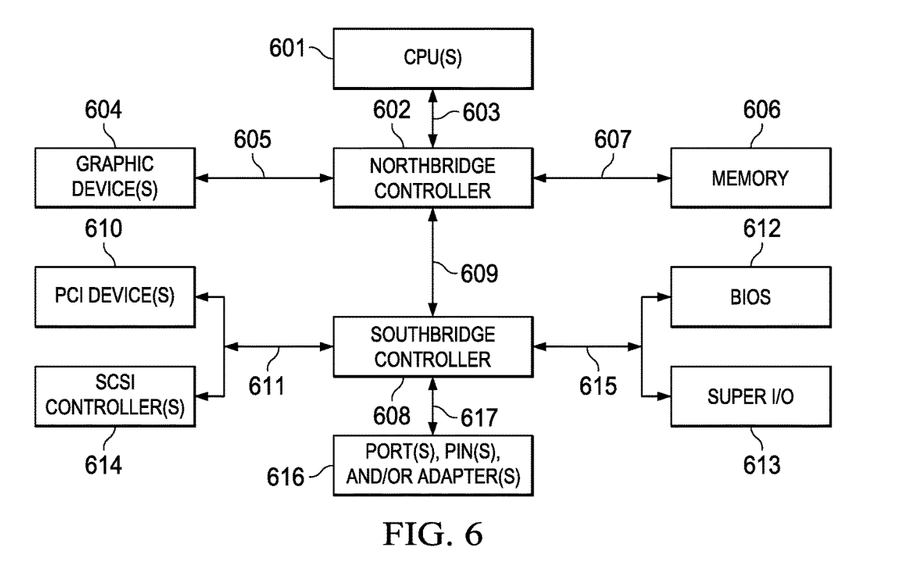
FIG. 6 is a block diagram illustrating certain components of a host device of a data protection system according to various embodiments.

FIG. 6 is a block diagram of certain components of a host, as described above. As illustrated, a host may include one or more CPUs 601. In various embodiments, a host may be a single-processor system including one CPU 601, or a multi-processor system including two or more CPUs 601 (e.g., two, four, eight, or any other suitable number). CPU(s) 601 may include any processor capable of executing program instructions. For example, in various embodiments, CPU(s)

601 may be general-purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 601 may commonly, but not necessarily, implement the same ISA.

CPU(s) 601 are coupled to northbridge controller or chipset 601 via front-side bus 603. Northbridge controller 602 may be configured to coordinate I/O traffic between CPU(s) 601 and other components. For example, in this particular implementation, northbridge controller 602 is coupled to graphics device(s) 604 (e.g., one or more video cards or adaptors) via graphics bus 605 (e.g., an Accelerated Graphics Port or AGP bus, a Peripheral Component Interconnect or PCI bus, or the like). Northbridge controller 602 is also coupled to system memory 606 via memory bus 607. Memory 606 may be configured to store program instructions and/or data accessible by CPU(s) 601. In various embodiments, memory 606 may be implemented using any suitable memory technology, such as static RAM (SRAM), synchronous dynamic RAM (SDRAM), nonvolatile/Flash-type memory, or any other type of memory.

Northbridge controller 602 is coupled to southbridge controller or chipset 608 via internal bus 609. Generally speaking, southbridge controller 608 may be configured to handle various of a host's I/O operations, and it may provide interfaces such as, for instance, Universal Serial Bus (USB), audio, serial, parallel, Ethernet, or the like via port(s), pin(s), and/or adapter(s) 616 over bus 617. For example, southbridge controller 608 may be configured to allow data to be exchanged between a host and other devices, such as other hosts attached to a network (e.g., WAN 435). In various embodiments, southbridge controller 608 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol. The I/O capabilities of the host are utilized to interface with user 505 in the operation of the snapshot array manager 510 described with respect to FIG. 5.

Southbridge controller 608 may also enable connection to one or more keyboards, keypads, touch screens, scanning devices, voice or optical recognition devices, or any other devices suitable for entering or retrieving data. Multiple I/O devices may be present in a host. In some embodiments, I/O devices may be separate from a host and may interact with the host through a wired or wireless connection. As shown, southbridge controller 608 is further coupled to one or more PCI devices 610 (e.g., modems, network cards, sound cards, or video cards) and to one or more SCSI controllers 614 via parallel bus 611. Southbridge controller 608 is also coupled to Basic I/O System (BIOS) 612 and to Super I/O Controller 613 via Low Pin Count (LPC) bus 615.

BIOS 612 includes non-volatile memory having program instructions stored thereon. Those instructions may be usable CPU(s) 601 to initialize and test other hardware components and/or to load an Operating System (OS) onto a host. Super I/O Controller 613 combines interfaces for a variety of lower bandwidth or low data rate devices. Those devices may include, for example, floppy disks, parallel ports, keyboard and mouse, temperature sensor and fan speed monitoring/control, among others.

In some cases, a host may be configured to provide access to different types of computer-accessible media separate from memory 606. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to a host via northbridge controller 602 and/or southbridge controller 608. In certain embodiments, a host is configured to provide access to the memory provided by the primary volumes and/or the replicated target volumes present in a data protection system.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory comprising program instructions stored thereon that, upon execution by the processor, cause the IHS to:
store enterprise data in a primary volume;
store a plurality of snapshots referring to the enterprise data in the primary volume;
receive a command to replicate the plurality of snapshots separately from the enterprise data;
create a virtual volume in response to the command, wherein the virtual volume comprises pointers to the plurality of snapshots; and
replicating the plurality of snapshots to a first snapshot backup image volume and to a second snapshot backup image volume, wherein the plurality of snapshots at the first snapshot backup image volume is accessed by a client device in response to a determination that the client device can access the first snapshot backup image volume more efficiently than the client device can access the second snapshot backup image volume.

2. The IHS of claim 1, wherein the primary volume is replicated to one or more target volumes.

3. The IHS of claim 2, wherein the primary volume is replicated by a replication system of the data protection system.

4. The IHS of claim 3, wherein the virtual volume is replicated by the replication system of the data protection system.

5. The IHS of claim 4, wherein the virtual volume is replicated to a snapshot backup image volume.

6. The IHS of claim 1, wherein the primary volume and the virtual volume are within the same storage device.

7. The IHS of claim 1, wherein the program instructions, upon execution, further cause the IHS to:
monitor for completion of the replication of the virtual volume; and
discontinue replication of the virtual volume upon completion.

8. The IHS of claim 7, wherein the program instructions, upon execution, further cause the IHS to:
delete the virtual volume upon completion.

9. The IHS of claim 1, wherein a first snapshot data is stored to the primary volume in response to a command triggering the generation of the snapshot at a first time and wherein a second snapshot data is stored to the primary volume in response to a command triggering the generation of the snapshot at a second time.

10. The IHS of claim 9, wherein the program instructions, upon execution, further cause the IHS to:
delete replicated snapshot data corresponding to snapshots generated between the first time and the second time.

11. A method, comprising:
storing enterprise data in a primary volume using a first controller of an Information Handling System (IHS);
storing a plurality of snapshots referring to the enterprise data in the primary volume using the first controller;
receiving, via the first controller a command to backup the plurality of snapshots separately from the enterprise data;
creating, using a second controller of the HIS, a virtual volume in response to the command from the first controller, wherein the virtual volume comprises pointers to the plurality of snapshots; and
replicating the plurality of snapshots using the pointers, via the second controller, to a first snapshot backup image volume and to a second snapshot backup image volume, wherein the plurality of snapshots at the first snapshot backup image volume is accessed by a client device in response to a determination that the client device can access the first snapshot backup image volume more efficiently than the client device can access the second snapshot backup image volume.

12. The method of claim 11, wherein the primary volume is replicated to two or more target volumes.

13. The method of claim 12, and wherein the virtual volume is replicated by the replication system of the data protection system.

14. The method of claim 13, wherein the virtual volumes is replicated to a snapshot backup image volume.

15. The method of claim 11, wherein the virtual volume is a component of the source storage.

16. The method of claim 11, further comprising:
monitoring for completion of the replication of the virtual volume; and
discontinuing replication of the virtual volume upon completion.

17. The method of claim 16, further comprising:
deleting the virtual volume upon completion.

18. The method of claim 11, wherein a first snapshot data is stored to the primary volume in response to a command triggering the generation of the snapshot at a first time and wherein a second snapshot data is stored to the primary volume in response to a command triggering the generation of the snapshot at a second time.

19. The method of claim 18, further comprising:
deleting replicated snapshot data corresponding to snapshots generated between the first time and the second time.

20. A hardware memory device having program instructions stored thereon that, upon execution by a processor of an Information Handling System (IHS), cause the IHS to:
store enterprise data in a primary volume;
store a plurality of snapshots referring to the enterprise data in the primary volume;
receive a command to backup the plurality of snapshots separately from the enterprise data;
create a virtual volume in response to the command, wherein the virtual volume comprises pointers to the plurality of snapshots; and
replicating the plurality of snapshots directly from the primary volume using the pointers, to a first snapshot backup image volume and to a second snapshot backup image volume, wherein the plurality of snapshots at the first snapshot backup image volume is accessed by a client device in response to a determination that the client device can access the first snapshot backup image volume more efficiently than the client device can access the second snapshot backup image volume.

* * * * *